United States Patent
Wu et al.

(10) Patent No.: US 12,506,438 B2
(45) Date of Patent: Dec. 23, 2025

(54) SOLAR CONCENTRATOR WRAPPING FILMS

(71) Applicant: Toyota Motor Engineering & Manufacturing North America, Inc., Plano, TX (US)

(72) Inventors: Songtao Wu, Ann Arbor, MI (US); Debasish Banerjee, Ann Arbor, MI (US); Shinya Iwasaki, Susono (JP); Taizo Masuda, Yokohama (JP); Ryota Tomizawa, Susono (JP)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/615,178

(22) Filed: Mar. 25, 2024

(65) Prior Publication Data

US 2025/0300598 A1 Sep. 25, 2025

(51) Int. Cl.
*H02S 40/22* (2014.01)
*B60R 16/03* (2006.01)
*H02S 10/40* (2014.01)
*H10F 77/42* (2025.01)

(52) U.S. Cl.
CPC .............. *H02S 40/22* (2014.12); *B60R 16/03* (2013.01); *H02S 10/40* (2014.12); *H10F 77/42* (2025.01)

(58) Field of Classification Search
CPC ......... H10F 19/80–85; H10F 77/30–68; H02S 40/20–22

USPC .................................................. 136/243–265
See application file for complete search history.

(56) References Cited

U.S. PATENT DOCUMENTS

| 11,688,818 | B2 | 6/2023 | Lunt, III et al. |
| 2014/0130864 | A1 | 5/2014 | Lunt et al. |
| 2021/0351312 | A1* | 11/2021 | Lunt, III ................ C09K 11/06 |

OTHER PUBLICATIONS

Yang et al., "Integration of near-infrared harvesting transparent luminescent solar concentrators onto arbitrary surfaces," Journal of Luminescence, vol. 210, 2019, pp. 239-246.
R.J. King, "New Solar Vehicle Wrap That Powers Batteries will Debut at Smart Automotive Surfaces Show in Novi," Oct. 8, 2018, 2 pages, found at https://www.dbusiness.com/daily-news/new-solar-vehicle-wrap-that-powers-batteries-will-debut-at-smart-automotive-surfaces-show-in-novi/.
Benetti et al., "Alternative Uses of Luminescent Solar Concentrators," Nanoenergy Adv. 2022, vol. 2, issue 3, pp. 222-240.

* cited by examiner

*Primary Examiner* — Bach T Dinh
(74) *Attorney, Agent, or Firm* — Christopher G. Darrow; Darrow Mustafa PC

(57) ABSTRACT

A wrapping film includes a transparent film with an ultraviolet-near infrared (UV-NIR) active layer and a visibly transparent infrared (VTIR) reflective layer. The transparent film is configured to be wrapped onto a surface, the UV-NIR active layer is configured to absorb at least one of UV light or NIR light and emit IR light, and the VTIR reflective layer is configured to reflect the emitted IR light. The wrapping film also includes a photovoltaic solar cell disposed on an edge of and in optical communication with the transparent film and the photovoltaic solar cell is configured to receive the reflected IR light and generate electricity.

20 Claims, 4 Drawing Sheets

SOLAR CONCENTRATOR WRAPPING FILMS

TECHNICAL FIELD

The present disclosure relates generally to wrapping films, and particularly to transparent wrapping films.

BACKGROUND

A solar vehicle is an electric vehicle with self-contained solar cells that provide electrical energy to the vehicle via sunlight. However, incorporating solar cells as part of a solar vehicle can result in the solar vehicle having a look or shape that is not particularly pleasing to potential customers, and such solar vehicles are cost prohibitive.

The present disclosure addresses issues related to the use of solar cells, and other issues related to solar cells.

SUMMARY

This section provides a general summary of the disclosure and is not a comprehensive disclosure of its full scope or all of its features.

In one form of the present disclosure, a wrapping film includes a transparent film with an ultraviolet-near infrared (UV-NIR) active layer and a visibly transparent infrared (VTIR) reflective layer. The transparent film is configured to be wrapped onto a surface, the UV-NIR active layer is configured to absorb at least one of UV light or NIR light and emit IR light, and the VTIR reflective layer is configured to reflect the emitted IR light. The wrapping film also includes a photovoltaic solar cell disposed on an edge of and in optical communication with the transparent film and the photovoltaic solar cell is configured to receive the reflected IR light and generate electricity.

In another form of the present disclosure, a wrapping film includes a transparent film wrapped onto an outer surface of a structure and a photovoltaic solar cell disposed on an inner surface of the structure and in optical communication with the transparent film. The transparent film includes a UV-NIR active layer configured to absorb at least one of UV light or NIR light and emit IR light, and a VTIR reflective layer configured to reflect the emitted IR light such that the emitted IR light is reflected to the photovoltaic solar cell. In addition, the photovoltaic solar cell is configured to receive the reflected IR light and generate electricity.

In still another form of the present disclosure, a wrapping film includes a transparent film with an anti-reflective layer, a VTIR reflective layer, and a UV-NIR active layer sandwiched between the anti-reflective layer and the VTIR layer. The transparent film is wrapped onto an outer surface of a vehicle panel, the UV-NIR active layer is configured to absorb at least one of UV light or NIR light and emit IR light, and the VTIR reflective layer is configured to reflect the emitted IR light. The wrapping film also includes a photovoltaic solar cell disposed on an inner surface of the vehicle panel and in optical communication with the transparent film such that the photovoltaic solar cell receives the reflected IR light and generates electricity.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DETAILED DESCRIPTION

Figure 1A:
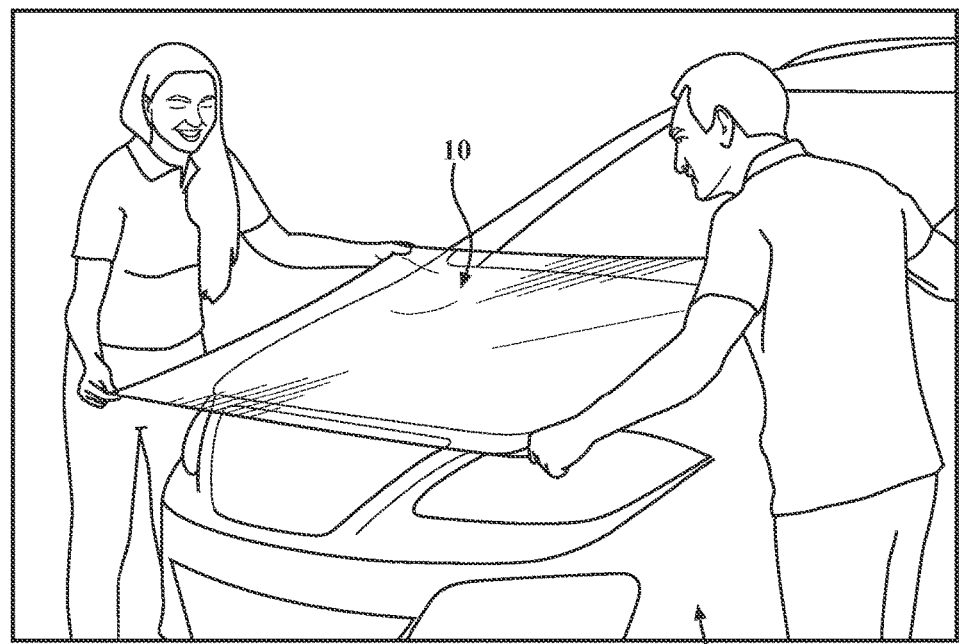
FIG. 1A shows a perspective view of a wrapping film being positioned relative to an outer surface of a vehicle.

The present disclosure provides a wrapping film that generates electrical energy from sunlight. As used herein, the phrase "wrapping film" refers to a film that is at least partially formed from a polymer and is configured to be applied and attached to a solid surface such that the surface to which it is applied is modified in some manner. That is, the wrapping film modifies a surface to which it is applied such that the surface is used as and/or is part of a system that generates electrical energy from sunlight. In the alternative, or in addition to, the wrapping film modifies an appearance of the surface to which it is applied.

The wrapping film includes a transparent film with an ultraviolet-near infrared (UV-NIR) active layer and a visibility transparent infrared (VTIR) reflective layer. As used herein, the term "ultraviolet" refers to ultraviolet electromagnetic radiation with wavelengths shorter than visible light but longer than x-ray electromagnetic radiation, e.g., between about 10 nanometers (nm) and about 400 nm. The term "infrared" refers to infrared electromagnetic radiation with wavelengths between about 700 nm and about 1,000,000 nm and the phrase "near infrared" refers to electromagnetic radiation with wavelengths between about 700 nm and about 2,500 nm.

The UV-NIR active layer is transparent to visible light, but absorbs UV and/or NIR electromagnetic radiation and emits IR electromagnetic radiation. Also, the VTIR reflective layer is transparent to visible light, but reflects IR electromagnetic radiation. As used herein, the term "transparent" refers to allowing at least 60% of incident visible light to pass therethrough, and the phrase "visible light" refers to electromagnetic radiation with wavelengths between about 400 nm and about 760 nm. In some variations, the UV-NIR active layer and/or the VTIR reflective layer allow at least 70% of incident visible light to pass therethrough, while in at least one variations the UV-NIR active layer and/or the VTIR reflective layer allow at least 80% of incident visible light to pass therethrough, e.g., at least 90% of incident visible light propagates through the UV-NIR active layer and/or the VTIR reflective layer.

The wrapping film also includes at least one photovoltaic solar cell (referred to herein simply as "the photovoltaic solar cell") in optical communication with the UV-NIR active layer. The photovoltaic solar cell is configured to receive IR electromagnetic radiation and produce electrical energy. Particularly, the VTIR reflective layer reflects the IR light emitted within the UV-NIR active layer such that the IR electromagnetic radiation propagates to the photovoltaic solar cell, and the photovoltaic solar cell receives the reflected IR electromagnetic radiation and produces or generates electrical energy.

The wrapping film is flexible and pliable such that it can be wrapped onto arcuate surfaces such as vehicle panels (e.g., vehicle surfaces such as hood panels, roof panels, sunroofs, trunk panels, side panels, vehicle windows, building windows, building roofs, building walls, lamp post panels, lamp posts, signage panels, shading structure surfaces, roof surfaces, and light post surfaces, among others.) In addition, the wrapping film can be wrapped onto an outer surface that faces the sun such that sunlight impinges on the transparent film, and the photovoltaic solar cell can be disposed on an inner surface that does not face the sun. Stated differently, the photovoltaic solar cells according to the wrapping films of the present disclosure can be disposed and/or attached to a surface that does not face or receive sunlight. In this manner, the outer surfaces of objects wrapped with the wrapping film of the present disclosure do not have photovoltaic solar cells thereon and the photovoltaic solar cells are not exposed to potentially harmful elements that the outer surface and the wrapping film are exposed to.

Figure 1B:
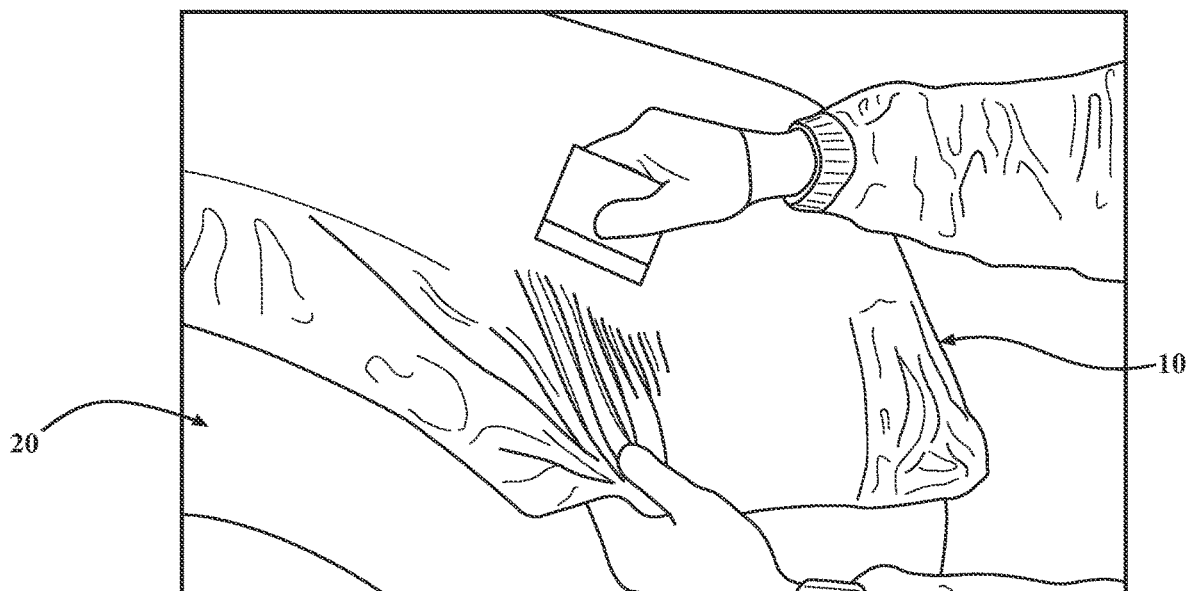
FIG. 1B shows a perspective of the wrapping film in FIG. 1A being "wrapped" on the outer surface of the vehicle.

Referring to FIGS. 1A and 1B, a perspective view of a wrapping film 10 according to the teachings of the present disclosure is shown. Particularly, the wrapping film 10 is shown being positioned over an outer surface of a structure 20 in the form of a vehicle in FIG. 1A and the process of wrapping the wrapping film 10 onto the outer surface of the structure 20 is shown in FIG. 1B. As observed from FIGS. 1A-1B, the outer surface of the structure 20 is contoured and has various curves and/or corners that are covered and wrapped by the wrapping film 10. And while not shown in FIGS. 1A-1B, it should be understood that the process of applying the wrapping film 10 to an outer surface of a structure includes one or more of the following: cleaning the surface to which the wrapping film 10 is to be applied and attached to; measuring and cutting the wrapping film 10; laying and wrapping the wrapping film 10 onto the outer surface of the structure 20; wrapping or tucking edge portions of the wrapping film around and onto the inner surface of the structure; and heating the wrapping film 10 such that the wrapping film draws towards and is attached to the outer surface and inner surface of the structure.

Figure 2:
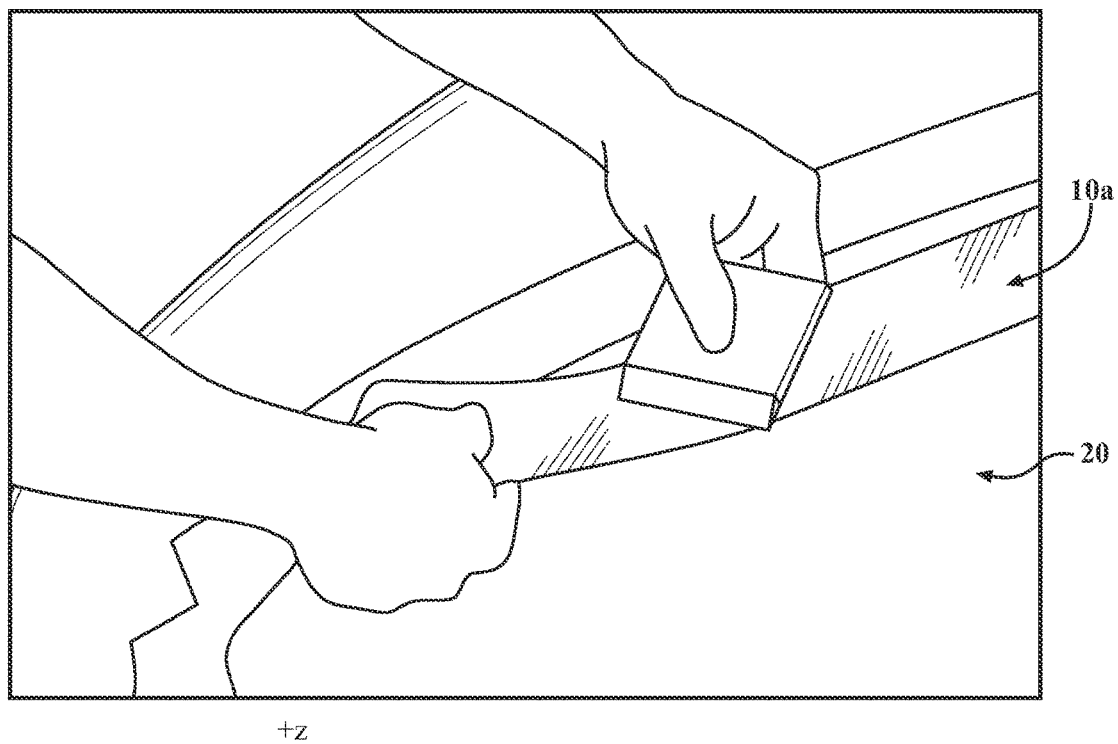
FIG. 2 shows a perspective of another wrapping film being "wrapped" on an outer surface of a vehicle.

It should be understood that FIGS. 1A-1B illustrate the wrapping film 10 covering an entire outer surface of a panel (e.g., a hood panel) of the structure 20. However, in some variations, a wrapping film 10a according to the teachings of the present disclosure covers less than the entire outer surface of a structure as illustrated in FIG. 2.

Figure 3:
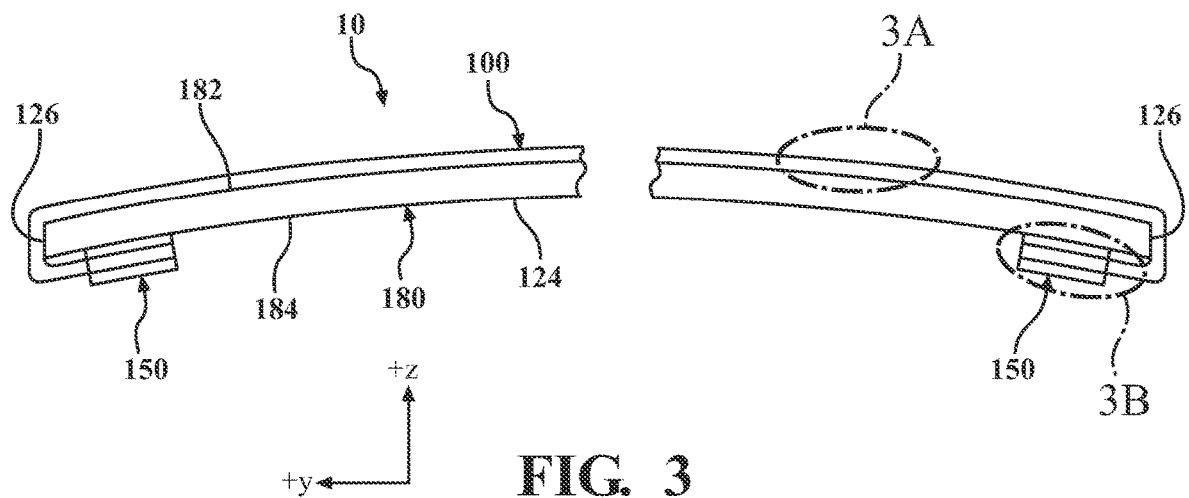
FIG. 3 shows a cross-sectional view of a wrapping film according to the teachings of the present disclosure.
Figure 3A:
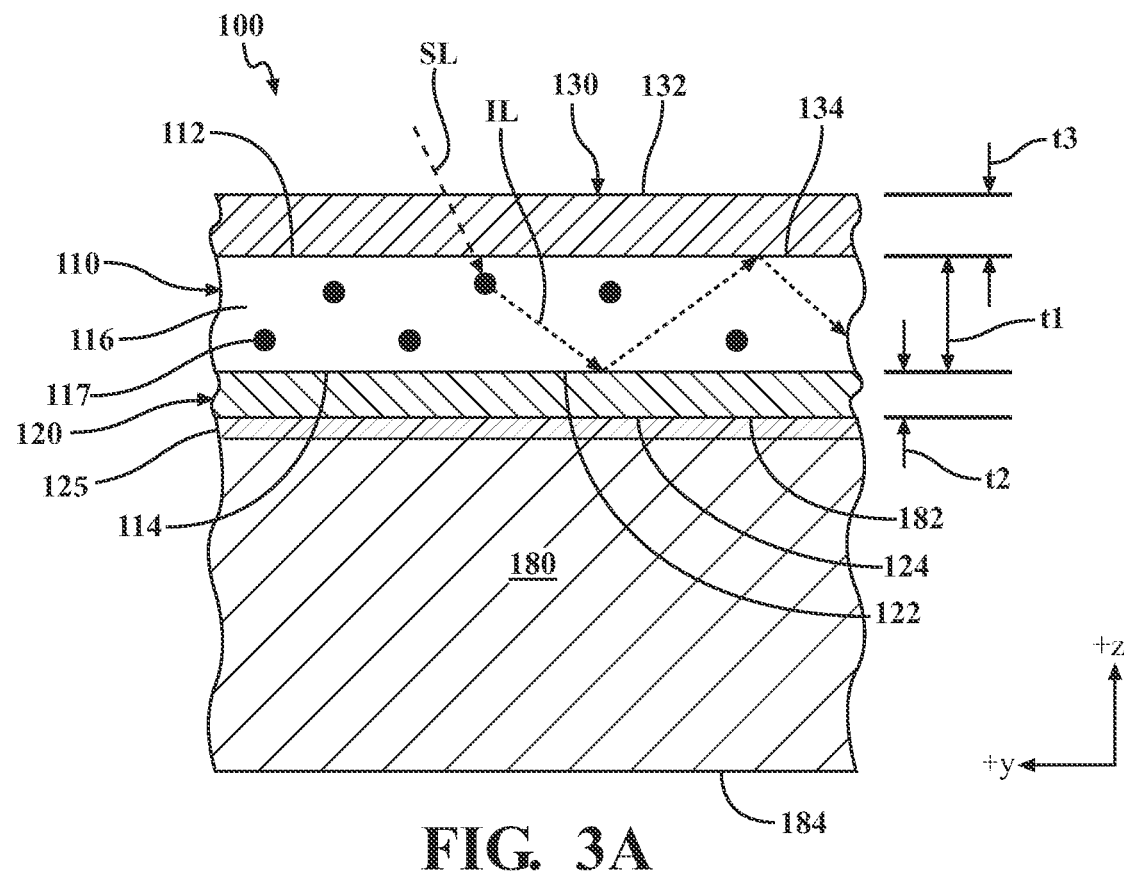
FIG. 3A shows an enlarged view of section 3A in FIG. 3.
Figure 3B:
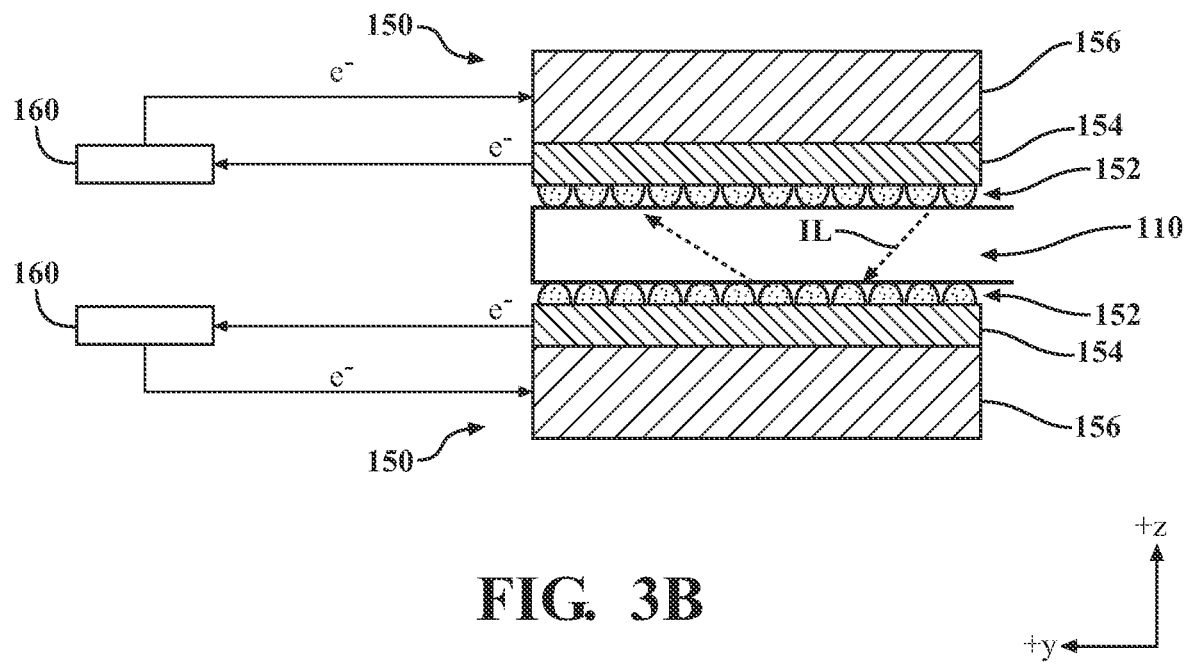
FIG. 3B shows an enlarged view of section 3B in FIG. 3.

Referring to FIGS. 3-3B, a cross-sectional view of the wrapping film 10 wrapped onto a structure 180 is shown in FIG. 3, an enlarged view of section 3A in FIG. 3 is shown in FIG. 3A, and an enlarged view of section 3B in FIG. 3 is shown in FIG. 3B. For example, the structure 180 can be a vehicle hood panel or any other panel that is, or will be, exposed to sunlight.

With reference to FIGS. 3 and 3A, the wrapping film 10 includes a transparent layer 100 and at least one photovoltaic solar cell 150. The transparent layer 100 includes a UV-NIR active layer 110, a VTIR reflective layer 120, and an optional outer layer 130, e.g., an anti-reflective layer 130. The VTIR reflective layer is disposed proximal to an outer surface of the structure 180, and the anti-reflective layer 130, when present, is disposed distal from the outer surface 182 of the structure 180.

The UV-NIR active layer 110 has an outer surface 112 and an inner surface 114, the VTIR reflective layer 120 has an outer surface 122 and an inner surface 124, and the outer layer 130, when included, has an outer surface 132 and an inner surface 134.

In some variations, the inner surface 114 of the UV-NIR active layer 110 is in direct contact with the outer surface 122 of the VTIR reflective layer 120. In other variations, one or more additional layers are disposed between the inner surface 114 of the UV-NIR active layer 110 and the outer surface 122 of the VTIR reflective layer 120.

In at least one variation, the inner surface 124 of the VTIR reflective layer 120 is in direct contact with an outer surface 182 of the structure 180. In other variations, one or more additional layers are disposed between the inner surface 124 of the VTIR reflective layer 120 and the outer surface 182 of the structure 180. For example, in some variations an optional transparent polymeric layer 125 is disposed between the inner surface 124 of the VTIR reflective layer 120 and the outer surface 182 of the structure 180.

In addition, and when the outer layer 130 is included, in some variations, the outer surface 112 of the UV-NIR active layer 110 is in direct contact with the inner surface 134 of the outer layer 130. In other variations, and when the outer layer 130 is included, one or more additional layers are disposed between the outer surface 112 of the UV-NIR active layer 110 and the inner surface 134 of the outer layer 130.

In some variations, the UV-NIR active layer 110 includes a polymeric matrix 116 and fluorescent components 117 such as fluorophores. Stated differently, the UV-NIR active layer 110 is formed from a polymer with fluorescent components disposed within the polymer. Not being bound by theory, when the fluorescent components 117 are exposed to sunlight 'SL', the fluorescent components 117 absorb predefined non-visible sunlight wavelengths and emit infrared light 'IL'.

Non-limiting examples of the polymer(s) that forms the polymeric matrix 116 include a vinyl polymer such as polyethylene, polypropylene, polystyrene, polyvinyl chloride, polyvinyl acetate, polyacrylonitrile, polyethylene terephthalate, and combinations thereof, among others, or non-vinyl polymers such as cellophane, polyolefin, acetate, poly (1,1,1,3,3,3-hexafluoroisopropyl acrylate), poly(2,2,3,3,4,4, 4-heptafluorobutyl acrylate), poly(2,2,3,3,4,4,4-heptafluorobutyl methacrylate), poly(2,2,3,3,3-pentafluoropropyl acrylate), poly(1,1,1,3,3,3-hexafluoroisopropyl methacrylate), poly(2,2,3,4,4,4-hexafluorobutyl acrylate), poly(2,2,3,4,4,4-hexafluorobutyl methacrylate), poly(2,2,3,3,3-pentafluoropropyl methacrylate), poly(2,2,2-trifluoroethyl acrylate), poly(2,2,3,3-tetrafluoropropyl acrylate), poly(2,2,3,3-tetrafluoropropyl methacrylate), poly(2,2,2-trifluoroethyl methacrylate), and combinations thereof, among others. Accordingly, in some variations the UV-NIR active layer 110 is a vinyl polymer layer, while in other variations the UV-NIR active layer is an acrylate polymer layer.

Non-limiting examples of the fluorescent components 117 include molecules of xanthene derivatives (e.g., fluoresceine and rhodaimine, among others), cyanine derivatives (e.g., cyanine, indocarbocyanine, oxacarbocyanine, thiacarbocyanine, and merocyanine), squaraine derivatives and ring-substituted squaraines, naphthalene derivatives, coumarin derivatives, oxadiazole derivatives (e.g., pyridyloxazole, nitrobenzoxadiazole, and benzoxadiazole), anthracene derivatives (e.g., anthraquiones), pyrene derivatives, oxazine derivatives, acridine derivatives (e.g., proflavine, acridine orange, acridine yellow), arylmethine derivatives (e.g., auramine), tetrapyrrole derivatives (e.g., porphin, phthalocyanine, bilirubin), and dipyrromethene derivatives, among others.

The fluorescent components 117 absorb light with UV and/or NIR wavelengths and generally do not absorb light with visible wavelengths. Stated differently, in some variations less than 50% of the light absorbed by the fluorescent components 117 is visible light. In other variations, less than 40% of the light absorbed by the fluorescent components 117 is visible light. And in at least one variation, less than 30% of the light absorbed by the fluorescent components 117 is visible light, e.g., less than 20%, less 10%, or less than 5% of the light absorbed by the fluorescent components 117 is visible light.

Non-limiting examples of the VTIR reflective layer 120 include transparent metal layer, a transparent conductive oxide layer, and combinations thereof. Not being bound by theory, materials that transmit visibly light have a high bandwidth (e.g., >3.2 eV) and/or are very thin (e.g., nanometer thick films). In addition, and to reflect IR radiation, materials need free electrons. Accordingly, thin metal films and oxides such as indium tin oxide (ITO) and zinc oxide (ZnO) are suitable for IR reflection. In some variations, dielectric/metal/dielectric (D/M/D) thin films, e.g., a ZnO/Ag/ZnO thin film, are used for VTIR reflective layers. And in such variations, the thin metal layer is transparent to visible light but reflects IR, and the dielectric layers are anti-reflective such that visible light transmission is enhanced. Also, the dielectric layers protect the metal layer sandwiched therebetween. In other variations, non-metallized multilayer optical films, e.g., 3M® Prestigious Film, use interference effects like 1D photonic crystals to control light transmission and reflection without metal layers. And in still yet other variations, IR-reflective dyes are incorporated within polymer films to enhance IR reflection capabilities.

Non-limiting examples of the outer layer 130, when present, include any visible-NIR transmissive layer, for example, layers made from acrylic (PMMA-Polymethyl Methacrylate), polycarbonate, polyethylene, polypropylene, polyvinyl chloride (PVC), polyethylene terephthalate (PET), polyimide, and combinations thereof.

As illustrated in FIG. 3A, sunlight SL impinges on the UV-NIR active layer 110 and the fluorescent components 117 absorb predefined non-visible sunlight wavelengths of the sunlight SL and emit infrared light 'IL'. In addition, the emitted infrared light IL is totally internally reflected within the transparent layer 100. Stated differently, the transparent layer 100 is a waveguide.

Not being bound by theory, and according to Snell's law, the UV-NIR active layer 110 has a higher index of refraction (n) value than that of the VTIR reflective layer 120 and the material, or air, at the outer surface 112 of the UV-NIR active layer 110. The transparent layer also desirably includes or is formed from a material with a low extinction coefficient (k) or scattering coefficient in the wavelength range of the emitted infrared light IL. Accordingly, the transparent layer 110 has a first index of refraction and the VTIR reflective layer 120 has a second index of refraction that is less than the first index of refraction. In addition, and in variations where the outer layer 130 is present, the outer layer 130 has a third index of refraction that is less than the first index of refraction.

For example, the UV-NIR active layer 110 can be formed from polypropylene with an index of refraction of about 1.49 for infrared light, polystyrene with an index of refraction of about 1.49 for infrared light, polyvinyl chloride with an index of refraction of about 1.53 for infrared light, polyvinyl acetate with an index of refraction of about 1.47 for infrared light, polyacrylonitrile with an index of refraction of about 1.49 for infrared light, or a combination thereof with an index of refraction between about 1.40 and 1.55. In the alternative, the UV-NIR active layer 110 can be formed from an acrylate polymer with an index of refraction of about 1.50 for infrared light.

In contrast, the VTIR reflective layers according to the teachings of the present disclosure have an index of refraction less than about 1.50, e.g., less than 1.30, less than about 1.20, less than 1.10, or less than 1.00. In addition, air has an index of refraction of 1.0 and the outer layer 130 has an index of refraction less than about 1.30, e.g., less than about 1.20, less than 1.10, or less than 1.00.

With reference to FIGS. 3 and 3B, the wrapping film 10 also includes one or more photovoltaic solar cells 150. The photovoltaic solar cell 150 is in optical communication with the UV-NIR active layer 110 such that the emitted IR light IL propagates to and interacts with the photovoltaic solar cell 150. Stated differently, the emitted infrared light IL is totally reflected within the transparent layer 100 such that the emitted infrared light IL propagates from the outer surface 182 of the structure 180 to the photovoltaic solar cell 150 disposed on the inner surface 184 of the structure 180.

Still referring to FIG. 3B, the photovoltaic solar cell 150 includes a scattering layer 152, an n-type layer 154, and a p-type layer 156. In some variations, a p-n type layer (not shown) is disposed between the n-type layer 154 and the p-type layer 156. As used herein, the phrase "n-type layer" refers to a layer of semiconductor material with excess or free electrons (e.g., silicon doped with phosphorus, arsenic, antimony, and/or bismuth) that and the phrase "p-type later" refers to a layer of semiconductor material with holes (e.g., silicon doped with boron and/or aluminum).

In some variations, the photovoltaic solar cell is in electrical communication with a load 160 such that when emitted IR light IL propagates to and impacts the scattering layer 152 and n-type layer 154, electrons (e) flow and provide electrical energy to the load 160. Accordingly, and during exposure of the wrapping film 10 to sunlight SL, emitted IR light IL is reflected within the transparent layer 100 and propagates to and impinges on the photovoltaic solar cell 150 such that electrical energy is created and provided to the load 160. Non-limiting examples of the load 160 include electrical devices such as batteries, capacitors, resistors, diodes, and transistors, among others. In addition, and with the photovoltaic solar cell 150 disposed on the inner surface 184 of the structure 180, the photovoltaic solar cell 150 does not interfere with the appearance of the wrapping film 10 on the outer surface 182 of the structure 180 and/or is not exposed to harmful elements such as rain, ice, snow, rocks, gravel, among others. Stated differently, the photovoltaic solar cell 150 is at least partially protected from damage that can be experienced by the outer surface 182 and/or the transparent layer 100 on the outer surface 182.

Figure 4:
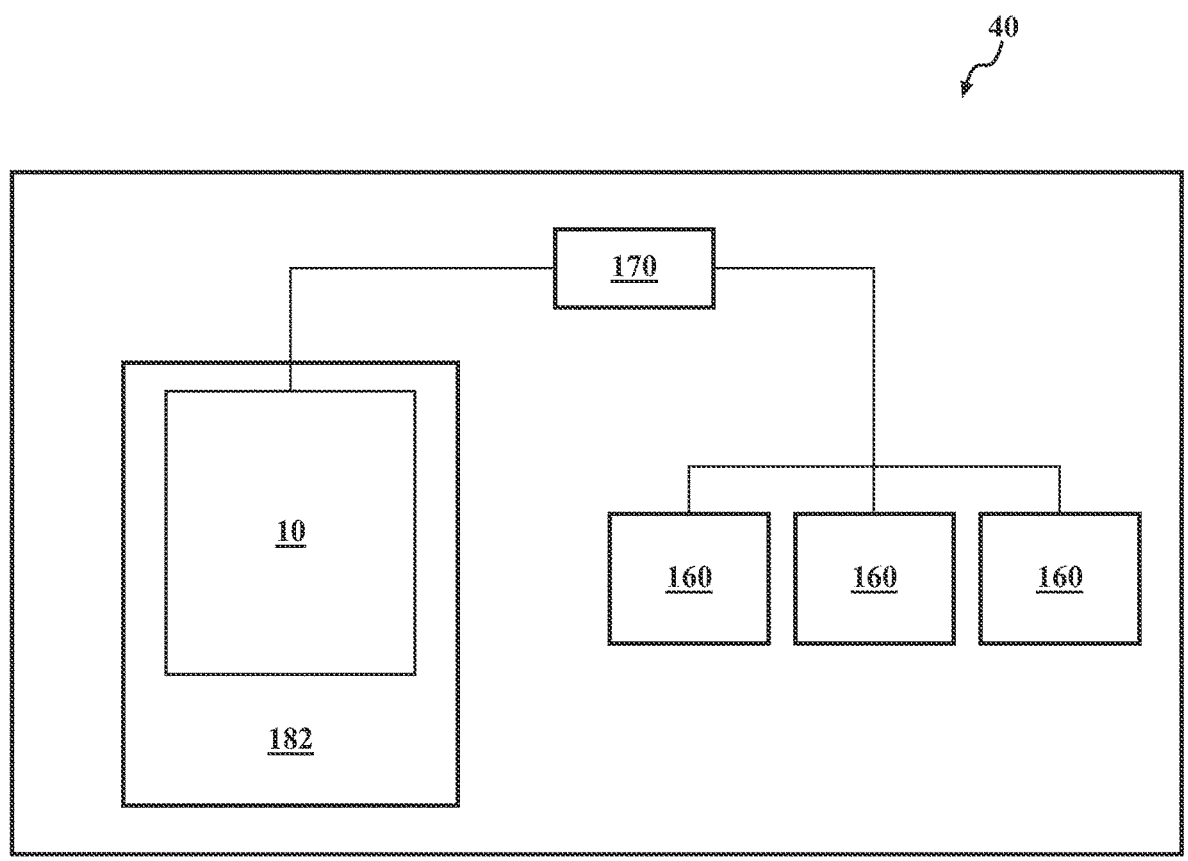
FIG. 4 is a block diagram for a system with a wrapping film according to the teachings of the present disclosure.

Referring to FIG. 4, a block diagram for a system 40 that includes the wrapping film 10 is shown. The system 40 includes the wrapping film disposed on the outer surface 182 of the structure 180 (FIG. 3), a controller 170 in electrical communication with the wrapping film 10, and one or more loads 160 in electrical communication with the controller 170. During operation of the system 40, the wrapping film 10 is disposed to sunlight. The wrapping film 10 is transparent to visible light such that the color and appearance of the outer surface 182 is still viewable (observable) to an individual looking at the outer surface 182. In addition, the fluorescent components 177 (FIG. 3A) absorb predefined non-visible wavelengths of the sunlight and emit IR light IL (FIG. 3A). The emitted IR light IL is reflected internally within the transparent layer 100 and propagates to and interacts with the photovoltaic solar cell 150 (FIG. 3B) such that electrical energy is generated. The controller 170 is configured to direct the electrical energy to the one or more loads 160, e.g., to recharge a battery. In this manner, the wrapping film 10 generates electrical energy while not blocking or covering an aesthetically pleasing surface from view.

As noted above, the wrapping film 10 is transparent. For example, the wrapping film 10 has color rendering index (CRI) of greater than or equal to about 80, greater than or equal to about 85, greater than or equal to about 90, or greater than or equal to about 95 with AM1.5 solar spectrum as a light source. Alternatively, or in addition to, the wrapping film 10 on the structure 180 has a reflected color rendering index (CRI) of greater than or equal to about 80, greater than or equal to about 85, greater than or equal to about 90, or greater than or equal to about 95 compared to the substrate alone when illuminated with the AM1.5 solar spectrum as the light source. Accordingly, when disposed onto the outer surface 182 of the structure 180, the color coordinates of the outer surface 182 with the wrapping film 10 thereon are within about 50%, within about 30%, within about 25%, within about 20%, within about 15%, within about 10%, or within about 5% of the color coordinates of the outer surface 182 alone. As used herein, "color coordinates" are quantitative metrics describing the dominant distribution of visible wavelengths in human color perception. Non-limiting examples of color coordinates include International Commission on Illumination (CIE) 1931 x,y,x, CIELUV 1976 L*u*v*, and CIELAB L*a*b*. Therefore, in some variations the appearance of the outer surface 182 with the wrapping film 10 wrapped thereon is substantially indistinguishable from the appearance of the outer surface 182 without the wrapping film 10.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7C, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for conducting the methods described herein is suited. A typical combination of hardware and software can be a processing system with computer-usable program code that, when being loaded and executed, controls the processing system such that it conducts the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to conduct these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

The headings (such as "Background" and "Summary") and sub-headings used herein are intended only for general organization of topics within the present disclosure and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be conducted in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A vehicle with a wrapping film comprising:
a panel comprising a contoured outer surface with curves and an inner surface oppositely disposed from the contoured outer surface;
a transparent film with an inner surface in contact with and wrapped around the contoured outer surface of the panel, the transparent film comprising a UV-NIR active layer and a visibly transparent IR (VTIR) reflective layer, the UV-NIR active layer configured to absorb at least one of UV light or NIR light and emit IR light, the VTIR reflective layer configured to reflect the emitted IR light; and
a photovoltaic solar cell disposed on an edge of and in optical communication with the transparent film, disposed on the inner surface of the panel such that the photovoltaic solar cell does not interfere with an appearance of the transparent film wrapped around the contoured outer surface of the panel, and configured to receive the reflected IR light and generate electricity.

2. The vehicle with the wrapping film according to claim 1, wherein the transparent film further comprises an anti-reflective layer.

3. The vehicle with the wrapping film according to claim 2, wherein the UV-NIR active layer is sandwiched between the VTIR reflective layer and the anti-reflective layer.

4. The vehicle with the wrapping film according to claim 3, wherein the UV-NIR active layer is in direct contact with the VTIR reflective layer and the anti-reflective layer.

5. The vehicle with the wrapping film according to claim 1, wherein the transparent film further comprises a polymeric layer.

6. The vehicle with the wrapping film according to claim 1, wherein the VTIR reflective layer comprises a metal layer.

7. The vehicle with the wrapping film according to claim 1, wherein the VTIR reflective layer comprises a transparent conductive oxide layer.

8. The wrapping film according to claim 1, wherein the transparent film is in direct contact with the contoured outer surface of the panel and further comprises an outer anti-reflective layer and the VTIR reflective layer is an inner VTIR reflective layer.

9. The vehicle with the wrapping film according to claim 1, wherein the panel is a hood panel of the vehicle.

10. The vehicle with the wrapping film according to claim 9, wherein the transparent film is wrapped around the contoured outer surface of the hood panel and the photovoltaic solar cell is disposed on the inner surface of the hood panel.

11. The vehicle with the wrapping film according to claim 1, wherein the panel is a roof panel of the vehicle.

12. The vehicle with the wrapping film according to claim 11, wherein the transparent film is wrapped around the contoured outer surface of the roof panel and the photovoltaic solar cell is disposed on the inner surface of the roof panel.

13. The vehicle with the wrapping film according to claim 1, wherein the panel is a side panel of the vehicle.

14. The vehicle with the wrapping film according to claim 13, wherein the transparent film is wrapped around the contoured outer surface of the side panel and the photovoltaic solar cell is disposed on the inner surface of the side panel.

15. The vehicle with the wrapping film according to claim 8, wherein the panel is a sunroof of the vehicle.

16. A vehicle with a wrapping film comprising:
a hood panel comprising a contoured outer surface with curves and an inner surface oppositely disposed from the contoured outer surface;
a transparent film comprising a UV-NIR active layer and a visibly transparent IR (VTIR) reflective layer, the transparent film in direct contact with and wrapped around the contoured outer surface of the hood panel, the UV-NIR active layer configured to absorb at least one of UV light or NIR light and emit IR light, the VTIR reflective layer configured to reflect the emitted IR light; and
a photovoltaic solar cell disposed on the inner surface of the hood panel such that the photovoltaic solar cell does not interfere with an appearance of the wrapping film on the contoured outer surface of the hood panel, the photovoltaic solar cell in optical communication with the transparent film and configured to receive the reflected IR light and generate electricity.

17. The vehicle with the wrapping film according to claim 16, wherein the transparent film further comprises an anti-reflective layer, the UV-NIR active layer is sandwiched between the VTIR reflective layer and the anti-reflective layer, the VTIR reflective layer is disposed proximal to the contoured outer surface of the hood panel, and the anti-reflective layer is disposed distal from the contoured outer surface of the hood panel.

18. The vehicle with the wrapping film according to claim 17, wherein the transparent film further comprises an outer anti-reflective layer and the VTIR reflective layer is an inner VTIR reflective layer.

19. A vehicle with a wrapping film comprising:
a roof panel comprising a contoured outer surface with curves and an inner surface oppositely disposed from the contoured outer surface;
a transparent film comprising an anti-reflective layer, a visibly transparent IR (VTIR) reflective layer, and a UV-NIR active layer sandwiched between the anti-reflective layer and the VTIR reflective layer, the transparent film wrapped onto an outer surface of the roof panel, the UV-NIR active layer configured to absorb at least one of UV light or NIR light and emit IR light, the VTIR reflective layer configured to reflect the emitted IR light; and
a photovoltaic solar cell disposed on an inner surface of the roof panel such that the photovoltaic solar cell does not interfere with an appearance of the wrapping film on the outer surface of the roof panel, the photovoltaic solar cell in optical communication with the transparent film and configured to receive the reflected IR light and generate electricity.

20. The vehicle with the wrapping film according to claim 19, wherein the vehicle panel is selected from the group consisting of a hood panel, a trunk panel, a sunroof, and a side panel.

* * * * *